(12) United States Patent
Wang et al.

(10) Patent No.: US 12,316,216 B2
(45) Date of Patent: May 27, 2025

(54) APFC CONVERTER CONTROL METHOD, APFC CONVERTER, AND INDUSTRIAL POWER SUPPLY

(71) Applicant: Wuhan Megmeet Electrical Co., Ltd, Wuhan (CN)

(72) Inventors: Zhong Wang, Wuhan (CN); Qiong Wu, Wuhan (CN)

(73) Assignee: Wuhan Megmeet Electrical Co., Ltd, Wuhan (CN)

( * ) Notice: Subject to any disclaimer, the term of this patent is extended or adjusted under 35 U.S.C. 154(b) by 232 days.

(21) Appl. No.: 18/218,022

(22) Filed: Jul. 4, 2023

(65) Prior Publication Data

US 2024/0128860 A1 Apr. 18, 2024

(30) Foreign Application Priority Data

Oct. 14, 2022 (CN) .......................... 202211262328.1

(51) Int. Cl.
*H02M 1/42* (2007.01)
*H02M 1/00* (2006.01)
*H02M 1/12* (2006.01)
*H02M 3/158* (2006.01)

(52) U.S. Cl.
CPC ....... *H02M 1/4233* (2013.01); *H02M 1/0019* (2021.05); *H02M 1/12* (2013.01); *H02M 3/158* (2013.01)

(58) Field of Classification Search
CPC .... H02M 1/4233; H02M 1/0019; H02M 1/12; H02M 1/19; H02M 3/156–158

USPC ........................................................ 323/207
See application file for complete search history.

(56) References Cited

U.S. PATENT DOCUMENTS

| | | | | |
|---|---|---|---|---|
| 7,157,886 B2* | 1/2007 | Agarwal | ............... | H02M 1/425 323/207 |
| 7,323,851 B2* | 1/2008 | Markowski | ......... | H02M 1/4225 363/80 |
| 2007/0067069 A1* | 3/2007 | Markowski | ......... | H02M 1/4225 700/297 |
| 2008/0284399 A1* | 11/2008 | Oettinger | .............. | H02M 3/157 323/283 |
| 2015/0146458 A1* | 5/2015 | Lim | .................... | H02M 1/4225 363/44 |

* cited by examiner

*Primary Examiner* — Yemane Mehari

(57) ABSTRACT

An APFC converter control method includes: obtaining an output voltage, an input voltage and an inductor current of the APFC converter; obtaining a voltage adjustment value according to a voltage error value between a preset reference voltage and the output voltage; obtaining a reference current according to the voltage adjustment value and the input voltage; obtaining a current error value according to the reference current and the inductor current; obtaining an adjustment coefficient of the proportional integration parameter; adjusting an integration parameter and a proportional parameter according to the adjustment coefficient; calculating an output control value according to the integration parameter, the proportional parameter and the current error value; and comparing the control value with sawtooth harmonics to adjust the duty cycle and to output a PWM signal.

18 Claims, 6 Drawing Sheets

APFC CONVERTER CONTROL METHOD, APFC CONVERTER, AND INDUSTRIAL POWER SUPPLY

CROSS REFERENCE TO RELATED APPLICATIONS

The present application claims priority of the Chinese patent application No. 202211262328.1, filed on Oct. 14, 2022, the contents of which are incorporated herein by its entireties.

TECHNICAL FIELD

The present disclosure relates to the field of power electronic control of industrial power supplies, and in particular to an active power factor correction (APFC) converter control method, an APFC converter, and an industrial power supply.

BACKGROUND

During industrial production in practice, a high-voltage alternating current may be generated. In order to meet needs of various users about power characteristics, an industrial frequency alternating current (AC) needs to be converted into a direct current, and the direct current (DC) is further applied to an electrical equipment.

In the art, a conventional full-bridge rectification and filtering current conversion circuit is usually arranged to convert the AC into the DC. However, an input current has a current only when an input voltage is greater than an output voltage, and in this case, distortion is severe, and total harmonic distortion (THD) is extremely high. When a large amount of this type of current is used, normal operation of a power grid may be affected. By applying the APFC technology, a power factor of a power electronic device may be improved, and harmonic pollution of the power grid may be reduced. However, an adjustment coefficient of a controller arranged in an APFC converter is generally a fixed value, and that is, a current waveform may not very well track a waveform of the input voltage, such that the power factor of the APFC converter may be affected.

SUMMARY OF THE DISCLOSURE

The present disclosure provides an active power factor correction (APFC) converter control method, an APFC converter, and an industrial power supply. According to the present disclosure, the adjustment factor of the APFC converter controller is changed based on the waveform of the input voltage to improve the power factor of the APFC converter, such that the amount of harmonics is reduced significantly.

According to a first aspect, the present disclosure provides an active power factor correction (APFC) converter control method, including: obtaining an output voltage, an input voltage, and an inductor current of an APFC converter; performing an error amplification process, based on a voltage error value of a preset reference voltage and the output voltage, to obtain a voltage adjustment value; obtaining a reference current based on the voltage adjustment value and the input voltage; obtaining a current error value based on the reference current and the inductor current; obtaining an adjustment coefficient of a proportional integration parameter; adjusting an integration parameter and a proportional parameter based on the adjustment coefficient; calculating an output control value based on the integration parameter, the proportional parameter, and the current error value; comparing the control value with a sawtooth harmonic wave to adjust a duty cycle and to output a PWM signal, wherein the PWM signal is configured to adjust the inductor current of the APFC converter to enable a waveform of the inductor current to track a waveform of the input voltage.

In some embodiments, the obtaining an adjustment coefficient of a proportional integration parameter, comprises obtaining the adjustment coefficient based on the following equation:

$$\text{coeff} = -k^* |V_{in}|/V_{max} + b,$$

the coeff is the adjustment coefficient, each of the k and the b is an adjustment parameter, the $|V_{in}|$ is a pulse voltage, and the $V_{max}$ is a peak voltage of power grids.

In some embodiments, the adjusting an integration parameter and a proportional parameter based on the adjustment coefficient, comprises: adjusting the integration parameter and the proportional parameter based on the following equation:

$$k_p = K_p * \text{coeff; and}$$

$$k_i = K_i * \text{coeff,}$$

the kp is the proportional parameter after the adjusting, the ki is the integration parameter after the adjusting, the Kp is the proportional parameter before the adjusting, the Ki is the integration parameter before the adjusting, and the coeff is the adjustment coefficient.

In some embodiments, the calculating an output control value based on the integration parameter, the proportional parameter, and the current error value, comprises: calculating the control value based on the following equation:

$$y = kp^* \Delta I + K_i^* Ts^* 1/(z-1)^* \Delta I,$$

the y is the control value, the $\Delta I$ is the current error value, the $T_s$ is a calculation period, the $1/(z-1)$ is variation characteristic of a zero-order retainer, the $k_p$ is the proportional parameter after the adjusting, and the $k_i$ is the integration parameter after the adjusting.

In some embodiments, after the obtaining an output voltage, an input voltage, and an inductor current of an APFC converter, the method further comprises: performing a filtering correction process on each of the output voltage, the input voltage, and the inductor current.

In some embodiments, the APFC converter further comprises an inductor and a rectifier capacitor; and before the obtaining an output voltage, an input voltage, and an inductor current of an APFC converter, the method further comprises: starting current limiting protection when the input voltage is increased to reach a mains voltage; obtaining the pulse voltage based on the input voltage; charging the inductor and the rectifier capacitor by using the pulse voltage; cutting out the current limiting protection when the inductor and the rectifier capacitor being charged to reach a desired voltage.

According to a second aspect, the present disclosure provides an APFC converter, comprising a control circuit. The control circuit comprises a control unit, an analog-to-digital converter connected to the control unit, a first controller connected to the control unit, a second controller connected to the control unit, and a data processing unit connected to the control unit; the control unit is configured to send a sampling signal to the analog-to-digital converter; the analog-to-digital converter is configured to sample an output voltage, an input voltage, and an inductor current of the APFC converter based on the sampling signal; the first controller is configured to obtain a preset reference voltage and the output voltage and to control a voltage adjustment value based on the preset reference voltage and the output voltage; the data processing unit is configured to obtain the voltage adjustment value and the input voltage and to calculate and output a reference current based on the voltage adjustment value and the input voltage; the second controller is configured to: obtain the reference current and the inductor current, obtain a current error value based on the reference current and the inductor current; obtain an adjustment coefficient of a proportional integration parameter, adjust an integration parameter and a proportional parameter based on the adjustment coefficient, calculate an output control value based on the integration parameter, the proportional parameter and the current error value; and compare the control value to a sawtooth harmonic wave to adjust a duty cycle and to output a PWM signal, wherein the PWM signal is configured to adjust the inductor current of the APFC converter to allow a waveform of the inductor current to track a waveform of the input voltage.

In some embodiments, the control circuit further includes a sampling and filtering processing unit; and after the analog-to-digital converter obtains the output voltage, the input voltage and the inductor current, the sampling and filtering processing unit is configured to: perform a filtering correction process on each of the output voltage, the input voltage and the inductor current.

In some embodiments, the APFC converter further includes an inductor, a rectifier capacitor, a start-up current limiter, and a rectifier bridge. The start-up current limiter is configured to start current limiting protection when the input voltage increases to reach the mains voltage. The rectifier bridge is configured to obtain the pulse voltage based on the input voltage to charge the inductor and the rectifier capacitor; and the start-up current limiter is further configured to cut out the current limiting protection when the inductor and the rectifier capacitor being charged to reach a desired voltage.

According to a third aspect, the present disclosure provides an industrial power supply including the APFC converter as described in the above.

The present disclosure provides the APFC converter control method, the APFC converter, and the industrial power supply. According to the present disclosure, the output voltage, the input voltage, and the inductor current of the APFC converter is obtained. An error amplification process is performed based on the voltage error between the preset reference voltage and the output voltage, to obtain the voltage adjustment value. The reference current is obtained based on the voltage adjustment value and the input voltage. The current error is obtained based on the reference current and the inductor current. The adjustment coefficient of the proportional integration parameter is obtained. The integration parameter and the proportional parameter are adjusted based on the adjustment coefficient. The output control value is calculated based on the integration parameter, the proportional parameter and the current error value. The control value is compared to the sawtooth harmonic wave to adjust the duty cycle and to output the PWM signal. The PWM signal is configured to adjust the inductor current of the APFC converter to allow the inductor current waveform to track the waveform of the input voltage. The APFC converter control method and the APFC converter in the present disclosure changes the parameters of the regulator through the waveform of the mains voltage, such that the power factor of the APFC converter is improved, and content of the harmonic waves is reduced significantly.

BRIEF DESCRIPTION OF THE DRAWINGS

One or more embodiments are illustrated exemplarily by referring to the accompanying drawings. The illustration does not limit the embodiments. Elements in the accompanying drawings having the same reference numerical are represented as similar elements. Unless specifically stated, the accompanying drawings do not limit scales of the elements.

DETAILED DESCRIPTION

Figure 1:
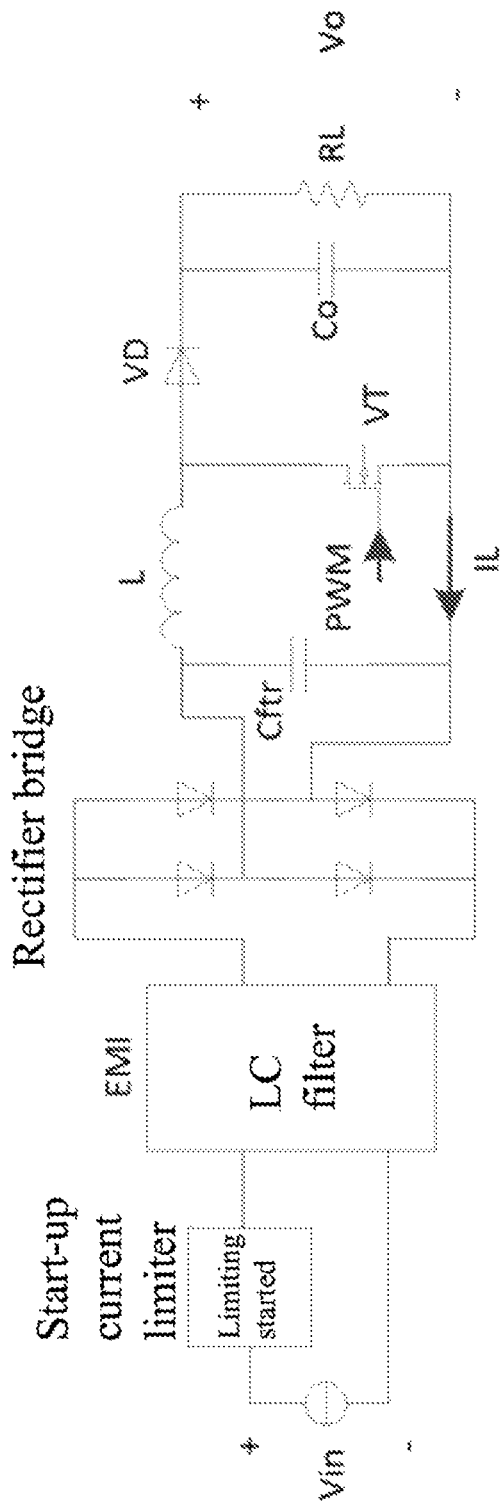
FIG. 1 is a schematic view of an application scenario of the APFC converter control method according to an embodiment of the present disclosure.

In order to make the object, technical solutions and advantages of the present disclosure clearer and more understandable, the present disclosure is described in further detail hereinafter by referring to the accompanying drawings and embodiments. It should be understood that the specific embodiments described herein are intended to explain the present disclosure only and are not intended to limit the present disclosure.

It should be noted that, individual features in the embodiments of the present disclosure can be combined with each other if the features do not conflict with each other, and all combinations are within the scope of the present disclosure. In addition, although functional modules are divided in the schematic view of the device and logical sequences are shown in the flow chart, in some cases, the functional modules can be divided in a way other than the device shown in the schematic view, and the operations can be performed in an order different from the order shown in the flow chart. In addition, the terms "first" and "second" used herein do not limit the data or the order of executing operations, but are used to distinguish the same or similar items that have substantially the same function and role.

Unless otherwise defined, all technical and scientific terms used in the present specification have the same meaning as commonly understood by any ordinary skilled person in the art. The terms in the specification of the present disclosure are used only for the purpose of describing specific embodiments and are not intended to limit the present disclosure. The term "and/or" used in the present specification includes any and all combinations of one or more of the relevant listed items.

In a conversion circuit where the DC is converted into the AC, generally, a stable output voltage is maintained by turning on and off a MOS tube. In practice, switching characteristics of a power electronic device is non-linear, and therefore, when the power electronic device is applied in a circuit, the power electronic device may absorb a non-sinusoidal current, such that a large amount of harmonic waves are generated. The large amount of harmonic waves may cause a power factor of the device to be reduced and cause the power grid to have significant power losses. For distortion of the current waveform caused by the harmonic wave, the power factor correction (PFC) technology is introduced. By applying the PFC, the current may track the voltage, and the distorted current is corrected to be sinusoidal by the PFC, such that the current is in the same phase with the voltage. In the art, the PFC includes active power factor correction (APFC) and passive power factor correction (PPFC).

A PFC converter is a device that converts an industrial frequency AC into the DC. In the conversion process, the power factor is increased, power utilization of the power grid is improved, and at the same time, the amount of harmonic waves is reduced, and voltage distortion, losses, and false operations of the power grid are reduced. In the present disclosure, the active power factor correction is applied. In the APFC control mode, a continuous current mode (CCM) is applied, the input current is continuous, a current ripple is small, and therefore, the instant APFC control mode is more suitable for high-power applications. In addition, in order to improve the power factor and to reduce the amount of harmonic waves, in the current control method of the present disclosure, an the average current control method is applied, a double closed-loop control strategy, which includes an inner loop and an outer loop, is applied as a control strategy of the APFC converter. The outer loop is a voltage loop, and the inner loop is a current loop. The voltage loop may control a stable voltage to be output, and the current loop allows the waveform of the inductor current to follow the waveform of the input voltage. In this way, the power factor of converting the industrial frequency AC into the DC is improved.

Performance indicators of the APFC converter, such as the power factor, the amount of harmonic waves, and so on, are determined based on how the current loop performs the controlling. In engineering applications, generally, the controller is adjusted to adapt a parameter to meet the performance indicators. The parameter may be generally fixed. However, the input voltage is the mains AC, and a value of the mains AC varies sinusoidally as time flows. The output voltage needs to be a stable DC voltage. Therefore, theoretically, controller having the fixed parameter is not optimal.

Therefore, embodiments of the present disclosure provide a self-adaptive adjusting and controlling method having a variable parameter, which has an additional layer of dimensionality. parameter of the regulator is changed by the waveform of the mains voltage, the power factor of the APFC converter is increased, and the amount of harmonic waves is reduced significantly.

Specifically, FIG. 1 is a schematic view of an application scenario of the APFC converter control method according to an embodiment of the present disclosure. The application scenario includes: a power supply of the power grid, a start-up current limiter, an EMI, a rectifier bridge, a filter capacitor Cftr, a boost chopper circuit, a rectifier capacitor Co, a load RL, and a control circuit.

A topology shown in the instant application scenario is a main circuit of the APFC converter. When the input voltage Vin increases to reach a voltage of the power grid, the APFC converter is started where a start-up rush current is large, and the current limiter is started to limit the current. In this case, the control circuit is not started, and that is, the switching MOS tube does not generate waves. The voltage of the power grids passes through the EMI, and electromagnetic interference caused by the AC is suppressed. The voltage of the power grids further passes through the full-bridge rectifier, and a pulse voltage is output. The pulse voltage passes through the inductor L and the diode VD and charges the rectifier capacitor Co directly. When the charging voltage of the rectifier capacitor Co is greater than $Kf^*V_{in}$ (0<Kf<0.3), and when time counted by a timing unit of a master DSP controller is greater than Ta (Ta>1s), a short-circuit cut-out control of the current limiter is started. The master DSP controller is a device which uses a digital signal processor to control circuits. The filter capacitor Cftr provides a smoothing function when the voltage of the diode VD reaches 0.7V and is suddenly cutoff, such that the voltage is slowly reduced from 0.7V to 0. The diode VD prevents the voltage from reversely backflowing when the rectifier capacitor Co is fully charged.

Figure 2:
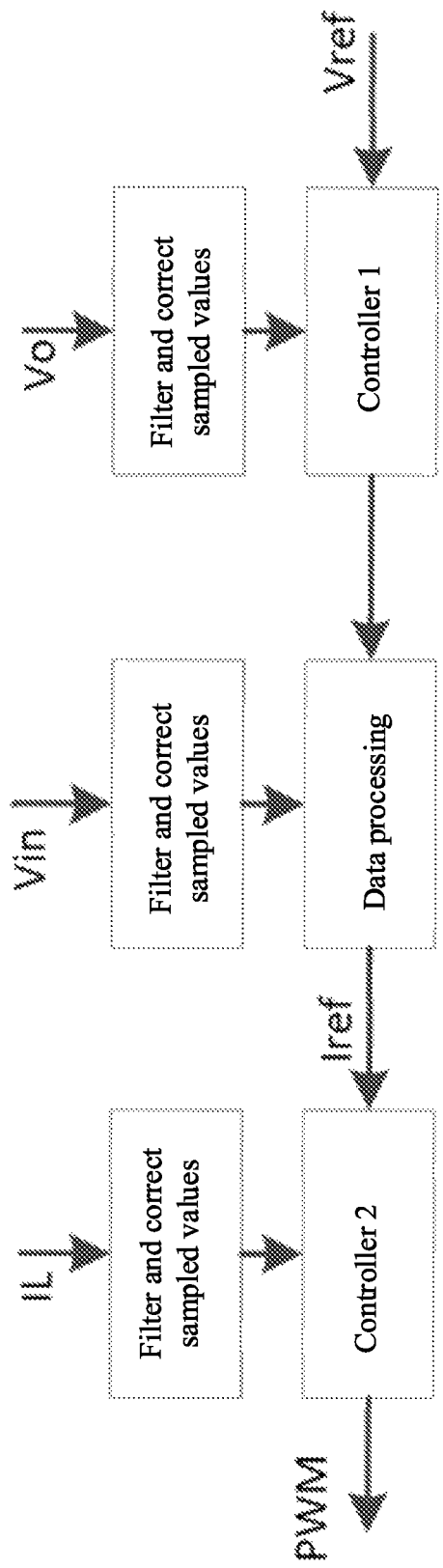
FIG. 2 is a control flow chart of the control circuit in the APFC converter according to an embodiment of the present disclosure.

After the control circuit receives the cut-out control of the start-up current limiter, a control unit of the control circuit is started. FIG. 2 is a control flow chart of the control circuit in the APFC converter according to an embodiment of the present disclosure. The control circuit includes: the control unit, an analog-to-digital converter, a first controller, a second controller, and a data processing unit. The control unit is connected to the analog-to-digital converter, the first controller, the second controller, and the data processing unit. The second controller is a PI controller.

In the art, each of an integration parameter and a proportional parameter of the second controller is a fixed value. Although power factor correction can be achieved and the amount of harmonic waves can be reduced, theoretically taking fixed values to achieve controlling is not optimal. According to the optimized APFC converter control method in the present disclosure, the parameter of the regulator can be changed by the waveform of the voltage of the power grid, the parameter of the second controller is not a fixed value, such that the power factor of the APFC converter is increased, the amount of harmonic waves is reduced significantly, and a better control is achieved.

Embodiment I

In detail, embodiments of the present disclosure will be described further by referring to the accompanying drawings.

Figure 3:
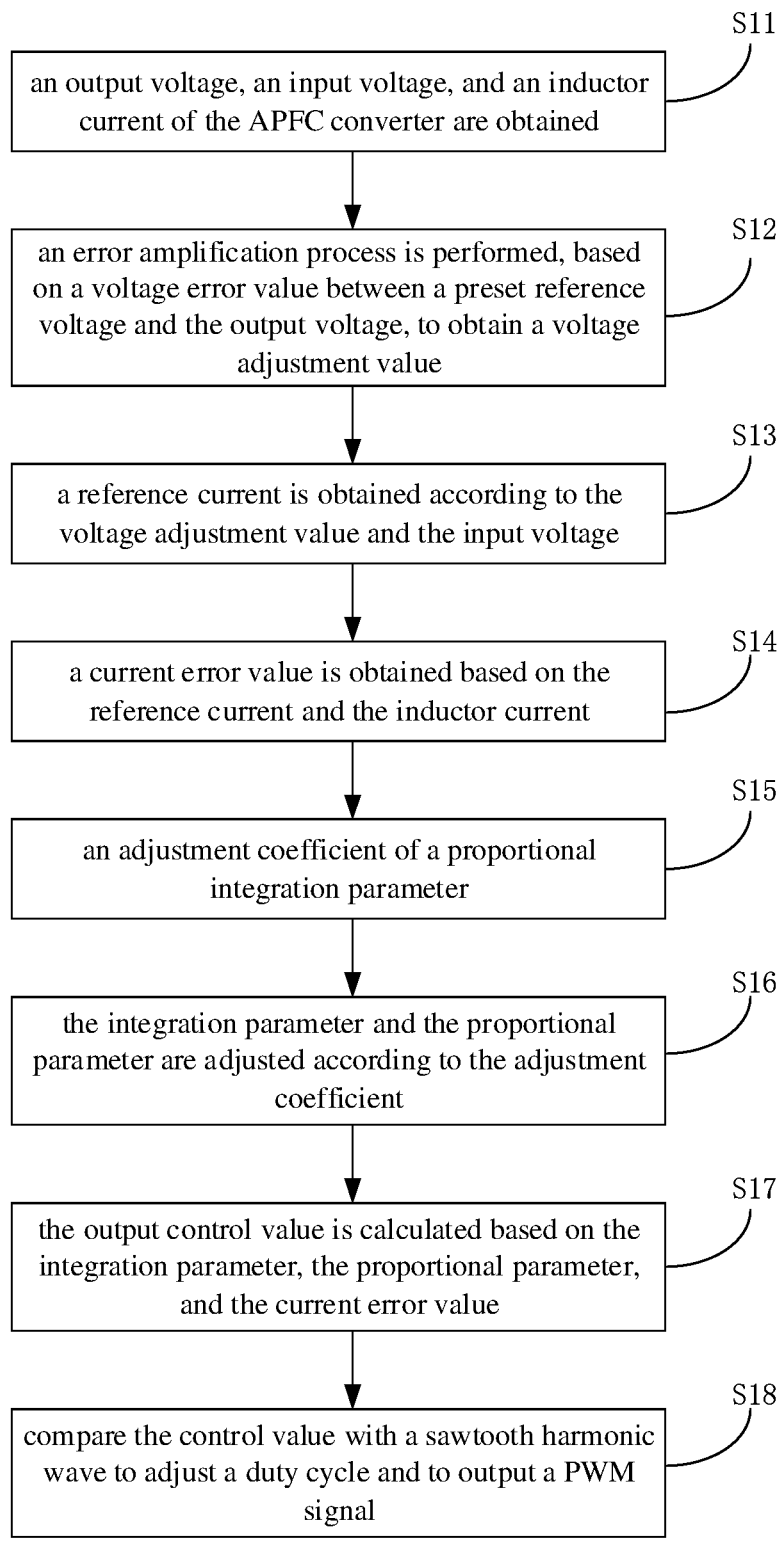
FIG. 3 is a flow chart of the APFC converter control method according to an embodiment of the present disclosure.

The present disclosure provides an APFC converter control method, as shown in FIG. 3, FIG. 3 is a flow chart of the APFC converter control method according to an embodiment of the present disclosure. The method includes, but is not limited to, the following operations.

In an operation S11, an output voltage, an input voltage, and an inductor current of the APFC converter are obtained.

The output voltage is a voltage value obtained after a voltage Vo at both ends of the capacitor is filtered and corrected. In the present embodiment, the input voltage $V_{in}$ and the inductor current IL may be configured to perform controlling after data conversion. The output voltage Vo is filtered by a large capacitor, and therefore, a phase of a ripple voltage may be in advance. The ripple voltage is an industrial frequency AC component included in the output voltage. In the control strategy, the ripple voltage may be filtered by a low-pass filter, ensuring phase consistency. Any analog sampling value needs to be filtered and corrected.

A control value of a filter controller is calculated by following the following equation:

$$A_{Filt}=(2*pi*fs*Ts)/(2*pi*fs*Ts+1);$$

$$B_{Filt}=1-A_{Filt};$$

$$y(k)=A_{Filt}*x(k)+B_{Filt}*y(k-1);$$

The $A_{Filt}$ is a filter coefficient that is currently input. The $B_{Filt}$ is a filter coefficient that is output previously. The pi is the constant π. The x(k) is a current input. The y(k) is a current output. The y(k−1) is a previous output. The fs is a cutoff frequency. The Ts is a control frequency. The k in the above y(k) equation is a time discrete value.

The sampled value is corrected based on the following correction function:

$$f(x)=k*x+b;$$

The x is an input. The f(x) is an output. The k in the above f(x) equation is a correction coefficient. The b is a correction bias.

In an operation S12, an error amplification process is performed, based on a voltage error value between a preset reference voltage and the output voltage, to obtain a voltage adjustment value. For the error amplification process, a voltage error amplifier may be applied; and the preset reference voltage Vref may be determined according to an actual situation and needs of the user, such as being determined as 400 V, which will not be limited by the present disclosure.

In an operation S13, a reference current is obtained according to the voltage adjustment value and the input voltage. The input voltage Vin is converted into a pulse voltage after being rectified by the full-bridge rectifier. A product of the pulse voltage and the voltage adjustment value serves as a reference current Iref for the current loop control. Specifically, a multiplier may be applied. The pulse voltage is a sinusoidal half-wave voltage waveform. The waveform of the pulse voltage is unchanged after the pulse voltage is multiplied with the voltage adjustment value. That is, a waveform of the reference current Iref has the same shape as the waveform of the pulse voltage.

In an operation S14, a current error value is obtained based on the reference current and the inductor current. The inductor current IL is the input current that is finally controlled by the current loop. The reference current Iref is compared to the inductor current IL. The error amplification process is performed on a result of the comparison to obtain the current error value ΔI. The error amplification process may be performed by using a current error amplifier.

Figure 4:
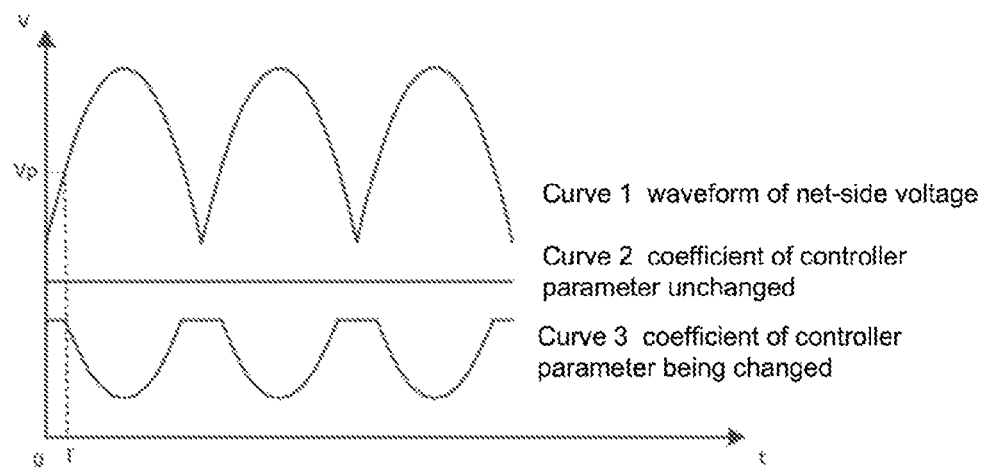
FIG. 4 is a schematic view of a curve showing a coefficient change in the parameter of the second controller according to an embodiment of the present disclosure.
Figure 6:
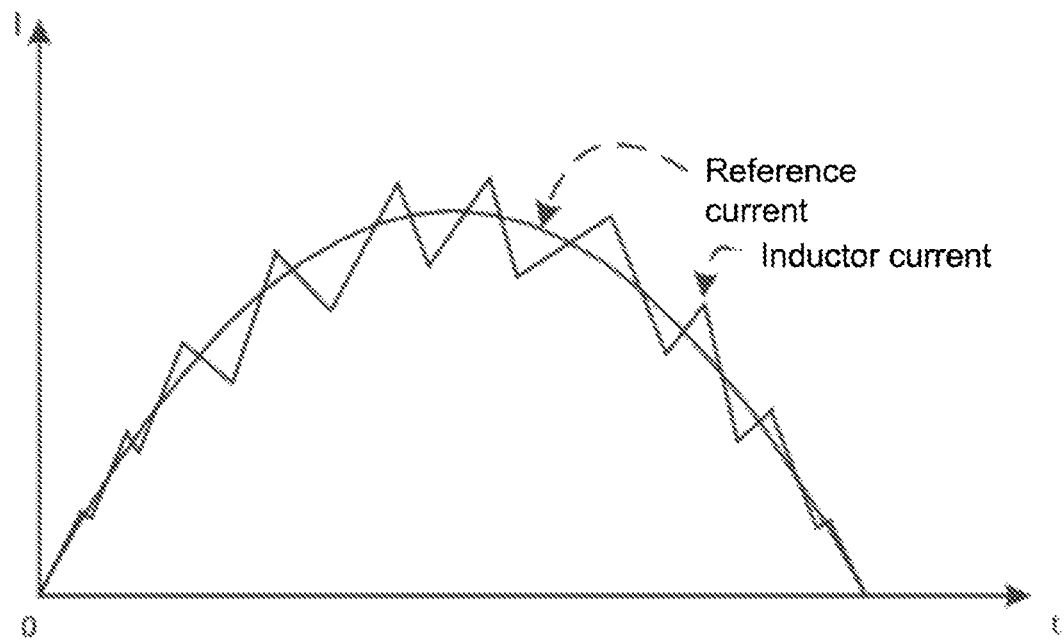
FIG. 6 is a schematic view of a curve showing a change in the referent current and the inductor current without introducing a variable parameter according to an embodiment of the present disclosure.

In an operation S15, an adjustment coefficient of a proportional integration parameter. The proportional integration parameter is a proportional parameter kp and an integration parameter ki. The adjustment coefficient is coeff. The adjustment coefficient coeff is configured to adjust magnitude of the proportional parameter kp and the integration parameter ki. Specifically, as shown in FIG. 4, FIG. 4 is a schematic view of a curve showing a coefficient change in the parameter of the second controller according to an embodiment of the present disclosure. A curve 1 is a net-side voltage waveform, i.e., the pulse voltage waveform. The pulse voltage is a full-wave rectified voltage obtained after the input voltage Vin passes through the rectifier bridge. In the art, the adjustment coefficient coeff of the second controller is a fixed value, shown as a curve 2. In order to carry out calculation easily, the adjustment coefficient coeff generally takes the value of 1. Specifically, as shown in FIG. 6, FIG. 6 is a schematic view of a curve showing a change in the referent current and the inductor current without introducing a variable parameter. According to the simulated change curve shown in FIG. 6, a tracking effect is better when the reference current passes the zero point, and the tracking effect is relatively poor when the current reaches a peak. The adjustment coefficient coeff in the present disclosure varies as the pulse voltage waveform changes, as shown as a curve 3 in FIG. 4. According to the tracking effect illustrated in FIG. 6, the proportional parameter and the integration parameter of the PI regulator are required to be larger in time periods before and after a trough of the sinusoidal waveform, whereas the proportional parameter and the integration parameter of the PI regulator are required to be less in time periods before and after the peak of the sinusoidal waveform.

The adjustment coefficient is obtained based on the following equation:

$$coeff=-k*|V_{in}|/V_{max}+b$$

The coeff is the adjustment coefficient. The k and the b are adjustment parameters. The $|V_{in}|$ is the pulse voltage. The $V_{max}$ is a peak of the power grid voltage. In the present disclosure, the preset coeff may be obtained by adjusting the k and the b. When the voltage value is less than Vp, the coeff is not adjusted. When the voltage value is greater than or equal to Vp, the k and the b are adjusted. In this way, the coeff is changed as the pulse voltage changes. For example, when an angle of the pulse voltage waveform is 90°, a target value of the adjustment coeff may be set to be 0.5. In this case, only the adjustment parameters k and b need to be changed, enabling the adjustment coeff to be adjusted to reach the target value. The target value of the adjustment coeff may be determined according to demands and will not be limited by the present disclosure.

In an operation S16, the integration parameter and the proportional parameter are adjusted according to the adjustment coefficient. The integration parameter and the proportional parameter are adjusted according to the following equation.

$$k_p=K_p*coeff$$

$$k_i=K_i*coeff$$

The $k_p$ is the proportional parameter after the adjustment, and the $k_i$ is the integration parameter after the adjustment. The $K_p$ is the proportional parameter before the adjustment, and the $K_i$ is the integration parameter before the adjustment. The coeff is the adjustment coefficient.

In an operation S17, the output control value is calculated based on the integration parameter, the proportional parameter, and the current error value. The control value is calculated according to the following equation.

$$y=k_p*\Delta I+k_i*T_s*1/(z-1)*\Delta I$$

The y is the control value. The ΔI is the current error value. The $T_s$ is a calculation period. The 1/(z−1) is variation characteristic of a zero-order retainer. The $k_p$ is the proportional parameter after the adjustment. The $k_i$ is the integration parameter after the adjustment. The current error value ΔI is an error value of the reference current Iref and the inductor current IL. The calculation period $T_s$ is a calculation period of the current loop. Since a digital system is applied in practice, the system needs to be discretized. In the present disclosure, the zero-order retainer is applied to perform discretization. The control value y is an output value of the second controller, and that is, an output value of the PI controller.

In an operation S18, compare the control value with a sawtooth harmonic wave to adjust a duty cycle and to output a PWM signal. The PWM signal is configured to adjust the inductor current of the APFC converter, enabling the waveform inductor current to track the waveform of the input voltage. The sawtooth harmonic wave is formed by a charging-discharging process that is constantly repeated by the rectifier capacitor Co.

Figure 5:
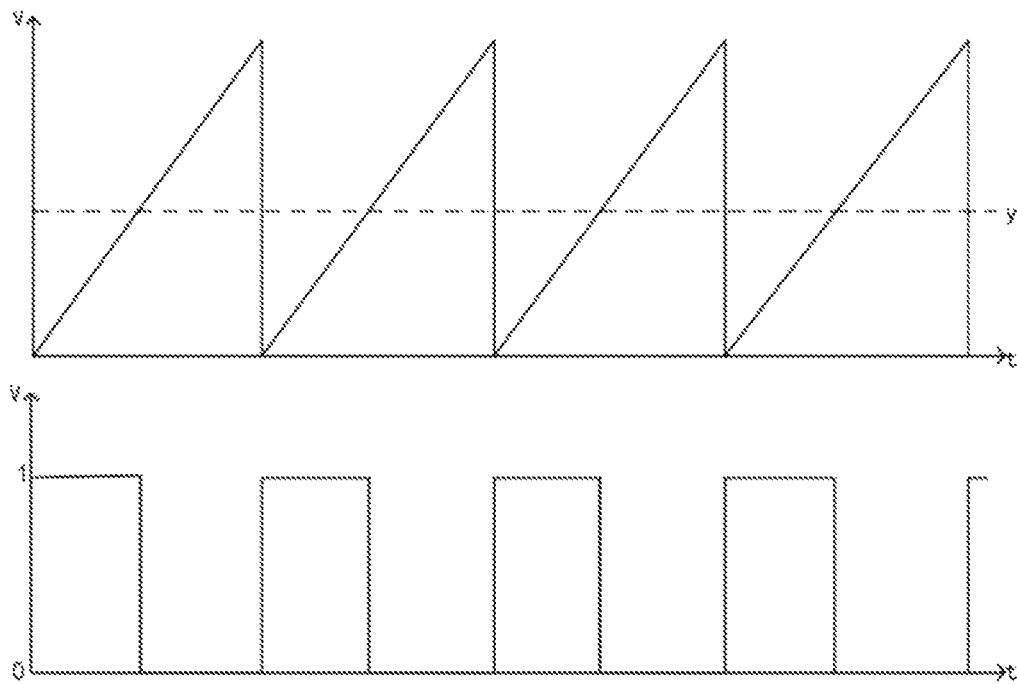
FIG. 5 is a schematic view of outputting the PWM signal according to an embodiment of the present disclosure.

As shown in FIG. 5, FIG. 5 is a schematic view of outputting the PWM signal according to an embodiment of the present disclosure. When the control value y is lower than the sawtooth harmonic wave, a low-level voltage is output, and the low-level voltage controls the switching MOS tube VT to be conducted. In this way, the pulse voltage charges the inductor L, and the inductor current IL is increased linearly. In this case, the diode VD is reversely biased cutoff, such that the current cannot flow through, and the rectifier capacitor Co uses previously stored energy to supply power to the load RL. When the control value y is greater than the sawtooth harmonic wave, a high-level voltage is output, and the high-level voltage controls the switching MOS tube VT to be non-conducted. In this way, the current of the inductor cannot be changed abruptly, and a reverse electric potential is generated, and that is, the inductor L has a positive voltage to a right direction and a negative voltage to a left direction. The voltage on the inductor L is superimposed with the pulse voltage, the superimposed voltage charges the rectifier capacitor Co and supplies power to the load RL, and the inductor current IL is decreased linearly. Subsequently, a second calculation period Ts is started, and the above process is repeated. The output PWM signal controls the switching MOS tube VT to be conducted or non-conducted, such that the output voltage Vo is controlled to remain stable, and the input current waveform tracks the input voltage waveform, such that power factor correction is achieved. When the control value y increases, a time length of outputting the high-level voltage increases, a time length Toff of the switching MOS tube VT being turned off increases, and the duty cycle D increases. When the control value y decreases, a time length of outputting the low-level voltage increases, a time length Toff of the switching MOS tube VT being conducted increases, and the duty cycle D decreases.

The voltage on the inductor L is calculated based on the following equation:

$$U = L \cdot (di/dt)$$

When the switching MOS tube VT is conducted, the voltage on the inductor L is the pulse voltage, and the following equation is met:

$$Vs = \frac{L \cdot di}{Ton}$$

When the switching MOS tube VT is turned off, the voltage on the inductor L is Vo-Vs, and the following equation is met:

$$Vo - Vs = \frac{L \cdot di}{Toff}$$

According to the volt-second balance principle, i.e., the current flowing on the inductor L when the switching MOS tube is conducted is equal to the current flowing on the inductor L when the switching MOS tube is non-conducted, the following equation is met:

$$Ton = \frac{L \cdot di}{Vs}; \text{ and}$$

$$Toff = \frac{L \cdot di}{Vo - Vs}.$$

The duty cycle is calculated based on the following equation:

$$D = \frac{Ton}{Ton + Toff}.$$

To summarize the above equations, the following equation is obtained:

$$D = \frac{Vo - Vs}{Vo}.$$

The Ton is the time length of the switching MOS tube VT being conducted, and the Toff is the time length of the switching MOS tube VT being non-conducted. The Vs is the pulse voltage. The Vo is the output voltage. The D is the duty cycle of the switching MOS tube VT being conducted.

Figure 7:
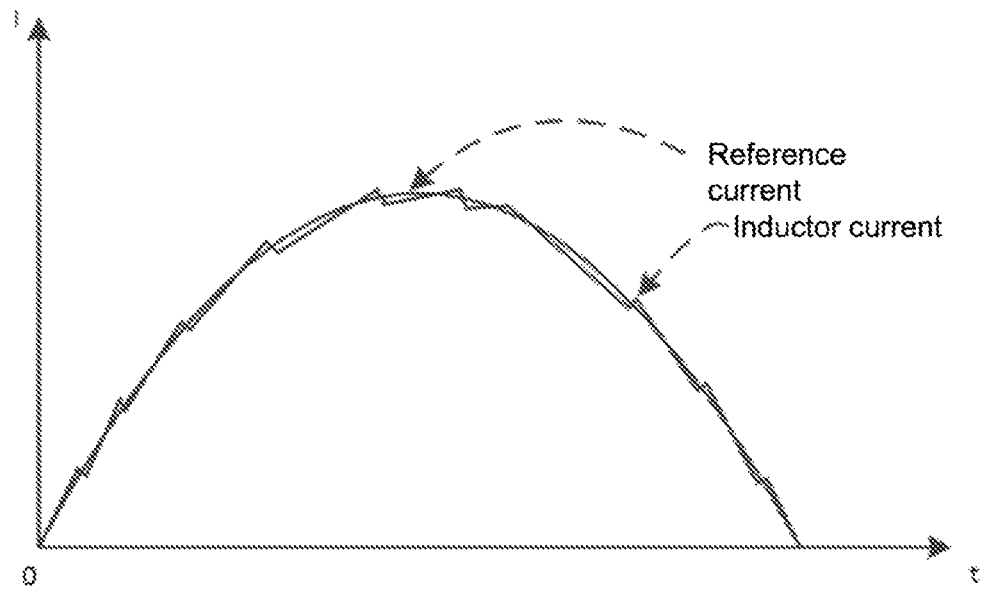
FIG. 7 is a schematic view of a curve showing a change in the referent current and the inductor current by introducing an adaptive variable parameter according to an embodiment of the present disclosure.

After the parameter of the second controller is adjusted, the PI regulator controls the inductor current to better track the reference current, and that is, the inductor current may better track the input voltage waveform. Specifically, as shown in FIG. 7, FIG. 7 is a schematic view of a curve showing a change in the referent current and the inductor current by introducing an adaptive variable parameter according to an embodiment of the present disclosure. The inductor current substantially coincides with the reference current, such that a better tracking effect is achieved. The control strategy allows the power factor to be increased significantly and allows the amount of harmonic waves in the power grid to be reduced significantly.

The embodiments of the present disclosure provide the APFC converter control method. In the method, the output voltage, the input voltage, and the inductor current of the APFC converter are sampled and are filtered and corrected. The voltage adjustment value is obtained based on the preset reference voltage and the output voltage. The reference current is obtained based on the voltage adjustment value and the input voltage. The current error value is obtained based on the reference current and the inductor current. The control value is output based on the current error value, the integration parameter of the controller, and the proportional parameter of the controller. The control value is compared to the sawtooth harmonic wave to adjust the duty cycle, and the PWM signal is output through the second controller. The PWM signal controls the inductor current waveform to track the input voltage waveform. The regulator parameter is changed by the waveform of the mains voltage, the power factor of the APFC converter is increased, and the amount of harmonic waves is reduced significantly.

Embodiment II

Figure 8:
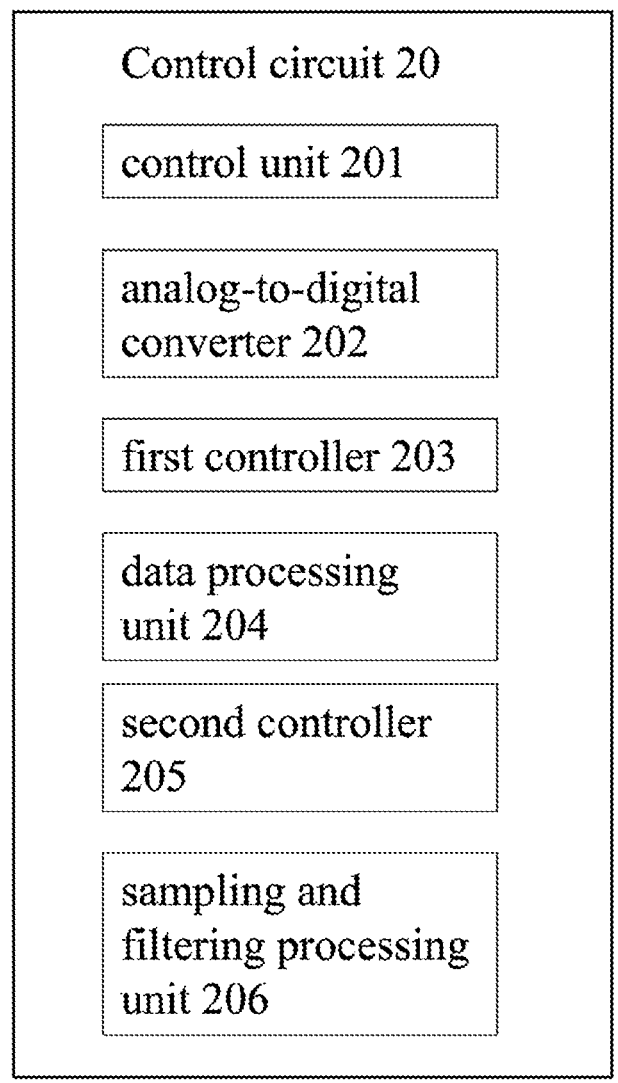
FIG. 8 is a control circuit of the APFC converter according to an embodiment of the present disclosure.

The present embodiment provides an APFC converter. The APFC converter includes a control circuit 20, as shown in FIG. 8. The control circuit 20 includes a control unit 201, an analog-to-digital converter 202 connected to the control unit 201, a first controller 203 connected to the control unit 201, a data processing unit 204 connected to the control unit 201, and a second controller 205 connected to the control unit 201.

The control unit 201 is configured to send a sampling signal to the analog-to-digital converter 202.

The analog-to-digital converter 202 is configured to sample the output voltage, the input voltage, and the inductor current of the APFC converter based on the sampling signal.

The first controller 203 is configured to obtain the preset reference voltage and the output voltage and to control the voltage adjustment value based on the preset reference voltage and the output voltage.

The data processing unit 204 is configured to obtain the voltage adjustment value and the input voltage and to calculate and output the reference current based on the voltage adjustment value and the input voltage.

The second controller 205 is configured to: obtain the current error value based on the reference current and the inductor current; obtain the adjustment coefficient of the proportional integration parameter, adjust the integration parameter and the proportional parameter based on the adjustment coefficient, calculate the output control value based on the integration parameter, the proportional parameter and the current error value; compare the control value to the sawtooth harmonic wave to adjust the duty cycle and to output the PWM signal. The PWM signal is configured to adjust the inductor current of the APFC converter to allow the waveform of the inductor current to track the waveform of the input voltage.

In some embodiments, as shown in FIG. 8, the control circuit 20 further includes a sampling and filtering processing unit 206. After the analog-to-digital converter 202 obtains the output voltage, the input voltage, and the inductor current, the sampling and filtering processing unit 206 is configured to perform the filtering correction process on the output voltage, the input voltage, and the inductor current.

In some embodiments, the APFC converter further includes an inductor, a rectifier capacitor, a start-up current limiter, and a rectifier bridge.

The start-up current limiter is configured to start current limiting for protection when the input voltage increases to reach the voltage the mains.

The rectifier bridge is configured to obtain the pulse voltage based on the input voltage to charge the inductor and the rectifier capacitor.

The start-up current limiter is further configured to cut out the current limiting protection when being charged to reach a desired voltage state.

It should be noted that the above-mentioned APFC converter may perform the APFC control method provided in the embodiments of the present disclosure. Corresponding functional modules for executing the method and technical details that are not described in detail in the APFC converter embodiments may be referred to the APFC control method provided in the embodiments of the present disclosure. The sampling and filtering processing unit in the APFC converter control circuit samples and performs filtering and correction process on the output voltage, the input voltage, and the inductor current of the APFC converter. The first controller obtains the voltage adjustment value based on the preset reference voltage and the output voltage. The data processing unit obtains the reference current based on the voltage adjustment value and the input voltage. The second controller obtains the current error value based on the reference current and the inductor current; outputs the control value according to the current error value, the integration parameter, and the proportional parameter of the controller; compares the control value with the sawtooth harmonic wave to adjust the duty cycle and to output the PWM signal. The PWM signal controls the inductor current waveform to track the input voltage waveform. Therefore, the regulator parameter is changed through the waveform of the mains voltage, the power factor of the APFC converter is increased, and the amount of harmonic waves is reduced significantly.

Embodiment III

The present disclosure provides an industrial power supply. The industrial power supply includes the APFC converter as described in the above embodiments. Therefore, the industrial power supply can perform the APFC control method provided in the embodiments of the present disclosure and have functional modules correspondingly for performing the APFC control method. Technical details not described in detail in this embodiment may be referred to the APFC control method and the APFC converter provided in the embodiments of the present disclosure. For the industrial power supply, while converting the industrial frequency AC into the DC, the power factor is increased, the power utilization is improved, and the amount of harmonic waves is reduced.

It should be noted that in each of the above embodiments, a certain execution order may not exist in various operations. Any ordinary skilled person in the art shall understand that the above operations can be performed in an order different from the order shown in the embodiments. That is, the operations can be performed in parallel, or the order in the embodiments may be reversed, and so on.

Finally, it should be noted that, the above embodiments are used only to illustrate but not limit the technical solution of the present disclosure. Based on the concept of the present disclosure, the above embodiments or the technical features in different embodiments may be combined with each other, the operations can be implemented in any order, and many other variations of different aspects of the present disclosure may be available. The variations are not provided in detail for brevity. Although the technical solution of the present disclosure is described in detail with reference to the embodiments, any ordinary skilled person in the art shall understand that the technical solutions in the above embodiments may be modified, or features may be equivalently substituted. The modifications or substitutions do not take the essence of the corresponding technical solutions away from of the scope of the embodiments of the present disclosure.

What is claimed is:

1. An active power factor correction (APFC) converter control method, comprising:
   obtaining an output voltage, an input voltage, and an inductor current of an APFC converter;
   performing an error amplification process, based on a voltage error value of a preset reference voltage and the output voltage, to obtain a voltage adjustment value;

obtaining a reference current based on the voltage adjustment value and the input voltage;

obtaining a current error value based on the reference current and the inductor current;

obtaining an adjustment coefficient of a proportional integration parameter;

adjusting an integration parameter and a proportional parameter based on the adjustment coefficient;

calculating an output control value based on the integration parameter, the proportional parameter, and the current error value;

comparing the control value with a sawtooth harmonic wave to adjust a duty cycle and to output a PWM signal, wherein the PWM signal is configured to adjust the inductor current of the APFC converter to enable a waveform of the inductor current to track a waveform of the input voltage.

2. The method according to claim 1, wherein the obtaining an adjustment coefficient of a proportional integration parameter, comprises:

obtaining the adjustment coefficient based on the following equation: $\text{coeff}=-k*|V_{in}|/V_{max}+b$, wherein the coeff is the adjustment coefficient, each of the k and the b is an adjustment parameter, the $|V_{in}|$ is a pulse voltage, and the $V_{max}$ is a peak voltage of power grids.

3. The method according to claim 1, wherein the adjusting an integration parameter and a proportional parameter based on the adjustment coefficient, comprises:

adjusting the integration parameter and the proportional parameter based on the following equation: $k_p=K_p*\text{coeff}$, and $k_i=K_i*\text{coeff}$, wherein the kp is the proportional parameter after the adjusting, the ki is the integration parameter after the adjusting, the $K_p$ is the proportional parameter before the adjusting, the $K_i$ is the integration parameter before the adjusting, and the coeff is the adjustment coefficient.

4. The method according to claim 1, wherein the calculating an output control value based on the integration parameter, the proportional parameter, and the current error value, comprises:

calculating the control value based on the following equation: $y=k_p*\Delta I+K_i*T_s*1/(z-1)*\Delta I$, wherein the y is the control value, the $\Delta I$ is the current error value, the $T_s$ is a calculation period, the $1/(z-1)$ is variation characteristic of a zero-order retainer, the $k_p$ is the proportional parameter after the adjusting, and the $k_i$ is the integration parameter after the adjusting.

5. The method according to claim 1, wherein after the obtaining an output voltage, an input voltage, and an inductor current of an APFC converter, the method further comprises:

performing a filtering correction process on each of the output voltage, the input voltage, and the inductor current.

6. The method according to claim 1, wherein the APFC converter further comprises an inductor and a rectifier capacitor; and before the obtaining an output voltage, an input voltage, and an inductor current of an APFC converter, the method further comprises:

starting current limiting protection when the input voltage is increased to reach a mains voltage;

obtaining the pulse voltage based on the input voltage;

charging the inductor and the rectifier capacitor by using the pulse voltage;

cutting out the current limiting protection when the inductor and the rectifier capacitor being charged to reach a desired voltage.

7. An active power factor correction (APFC) converter, comprising a control circuit, wherein the control circuit comprises a control unit, an analog-to-digital converter connected to the control unit, a first controller connected to the control unit, a second controller connected to the control unit, and a data processing unit connected to the control unit;

the control unit is configured to send a sampling signal to the analog-to-digital converter;

the analog-to-digital converter is configured to sample an output voltage, an input voltage, and an inductor current of the APFC converter based on the sampling signal;

the first controller is configured to obtain a preset reference voltage and the output voltage and to control a voltage adjustment value based on the preset reference voltage and the output voltage;

the data processing unit is configured to obtain the voltage adjustment value and the input voltage and to calculate and output a reference current based on the voltage adjustment value and the input voltage; and the second controller is configured to:

obtain the reference current and the inductor current, obtain a current error value based on the reference current and the inductor current;

obtain an adjustment coefficient of a proportional integration parameter, adjust an integration parameter and a proportional parameter based on the adjustment coefficient, calculate an output control value based on the integration parameter, the proportional parameter and the current error value; and compare the control value to a sawtooth harmonic wave to adjust a duty cycle and to output a PWM signal, wherein the PWM signal is configured to adjust the inductor current of the APFC converter to allow a waveform of the inductor current to track a waveform of the input voltage.

8. The APFC converter according to claim 7, wherein the control circuit further includes a sampling and filtering processing unit; and after the analog-to-digital converter obtains the output voltage, the input voltage and the inductor current, the sampling and filtering processing unit is configured to:

perform a filtering correction process on each of the output voltage, the input voltage and the inductor current.

9. The APFC converter according to claim 8, further comprising an inductor, a rectifier capacitor, a start-up current limiter, and a rectifier bridge, wherein, the start-up current limiter is configured to start current limiting protection when the input voltage increases to reach the mains voltage;

the rectifier bridge is configured to obtain the pulse voltage based on the input voltage to charge the inductor and the rectifier capacitor; and the start-up current limiter is further configured to cut out the current limiting protection when the inductor and the rectifier capacitor being charged to reach a desired voltage.

10. The APFC converter according to claim 7, wherein the second controller is further configured to obtain the adjustment coefficient based on the following equation: $\text{coeff}=-k*|V_{in}|/V_{max}+b$, wherein the coeff is the adjustment coefficient, each of the k and the b is an adjustment parameter, the $|V_{in}|$ is a pulse voltage, and the $V_{max}$ is a peak voltage of power grids.

11. The APFC converter according to claim 7, wherein the second controller is further configured to adjust the integration parameter and the proportional parameter based on the following equation: $k_p=K_p*$C0eff, and $k_i=K_i*$coeff, wherein the $k_p$ is the proportional parameter after the adjusting, the $k_i$ is the integration parameter after the adjusting, the $K_p$ is the proportional parameter before the adjusting, the $K_i$ is the integration parameter before the adjusting, and the coeff is the adjustment coefficient.

12. The APFC converter according to claim 7, wherein the second controller is further configured to calculate the control value based on the following equation: $y=k_p*\Delta I+K_i*T_s*1/(z-1)*\Delta I$, wherein the y is the control value, the $\Delta I$ is the current error value, the $T_s$ is a calculation period, the $1/(z-1)$ is variation characteristic of a zero-order retainer, the $k_p$ is the proportional parameter after the adjusting, and the $k_i$ is the integration parameter after the adjusting.

13. An industrial power supply, comprising an APFC converter, wherein the APFC converter comprises a control circuit, and the control circuit comprises a control unit, an analog-to-digital converter connected to the control unit, a first controller connected to the control unit, a second controller connected to the control unit, and a data processing unit connected to the control unit;

the control unit is configured to send a sampling signal to the analog-to-digital converter;

the analog-to-digital converter is configured to sample an output voltage, an input voltage, and an inductor current of the APFC converter based on the sampling signal;

the first controller is configured to obtain a preset reference voltage and the output voltage and to control a voltage adjustment value based on the preset reference voltage and the output voltage;

the data processing unit is configured to obtain the voltage adjustment value and the input voltage and to calculate and output a reference current based on the voltage adjustment value and the input voltage; and the second controller is configured to:
obtain the reference current and the inductor current, obtain a current error value based on the reference current and the inductor current;
obtain an adjustment coefficient of a proportional integration parameter, adjust an integration parameter and a proportional parameter based on the adjustment coefficient, calculate an output control value based on the integration parameter, the proportional parameter and the current error value; and
compare the control value to a sawtooth harmonic wave to adjust a duty cycle and to output a PWM signal, wherein the PWM signal is configured to adjust the inductor current of the APFC converter to allow a waveform of the inductor current to track a waveform of the input voltage.

14. The industrial power supply according to claim 13, wherein the control circuit further includes a sampling and filtering processing unit; and after the analog-to-digital converter obtains the output voltage, the input voltage and the inductor current, the sampling and filtering processing unit is configured to:

perform a filtering correction process on each of the output voltage, the input voltage and the inductor current.

15. The industrial power supply according to claim 14, wherein the APFC converter further comprises an inductor, a rectifier capacitor, a start-up current limiter, and a rectifier bridge, wherein, the start-up current limiter is configured to start current limiting protection when the input voltage increases to reach the mains voltage;

the rectifier bridge is configured to obtain the pulse voltage based on the input voltage to charge the inductor and the rectifier capacitor; and the start-up current limiter is further configured to cut out the current limiting protection when the inductor and the rectifier capacitor being charged to reach a desired voltage.

16. The industrial power supply according to claim 13, wherein the second controller is further configured to obtain the adjustment coefficient based on the following equation: coeff$=-k*|V_{in}|/V_{max}+b$, wherein the coeff is the adjustment coefficient, each of the k and the b is an adjustment parameter, the $|V_{in}|$ is a pulse voltage, and the $V_{max}$ is a peak voltage of power grids.

17. The industrial power supply according to claim 13, wherein the second controller is further configured to adjust the integration parameter and the proportional parameter based on the following equation: $k_p=K_p*$coeff, and $k_i=K_i*$coeff, wherein the $k_p$ is the proportional parameter after the adjusting, the $k_i$ is the integration parameter after the adjusting, the $K_p$ is the proportional parameter before the adjusting, the $K_i$ is the integration parameter before the adjusting, and the coeff is the adjustment coefficient.

18. The industrial power supply according to claim 13, wherein the second controller is further configured to calculate the control value based on the following equation: $y=k_p*\Delta I+K_i*Ts*1/(z-1)*\Delta I$, wherein the y is the control value, the $\Delta I$ is the current error value, the Ts is a calculation period, the $1/(z-1)$ is variation characteristic of a zero-order retainer, the $k_p$ is the proportional parameter after the adjusting, and the ki is the integration parameter after the adjusting.

* * * * *